United States Patent [19]                           [11] Patent Number: 4,531,864
Bylund                                                 [45] Date of Patent: Jul. 30, 1985

[54] CUTTING INSERT

[75] Inventor: Sven O. Bylund, Sandviken, Sweden

[73] Assignee: Santrade Ltd., Lucerne, Switzerland

[21] Appl. No.: 489,578

[22] Filed: Apr. 28, 1983

[30] Foreign Application Priority Data

May 17, 1982 [SE] Sweden ................................. 8203080

[51] Int. Cl.³ ........................ B23P 15/28; B26D 1/00; B26D 3/00
[52] U.S. Cl. ..................................... 407/114; 407/116
[58] Field of Search ........................ 407/114, 115, 116

[56] References Cited

U.S. PATENT DOCUMENTS

| Re. 30,908 | 4/1982  | Friedline et al. | 407/61 |
| 833,261    | 10/1906 | Tardif           | 407/43 |
| 3,701,187  | 10/1972 | Erkfritz         | 407/58 |
| 4,182,587  | 1/1980  | Striegl          | 407/113 |
| 4,335,984  | 6/1982  | Zweekly          | 407/114 |

FOREIGN PATENT DOCUMENTS

| 1517204 | 3/1968 | France         | 407/114 |
| 2054427 | 2/1981 | United Kingdom | 407/114 |

Primary Examiner—Lowell A. Larson
Assistant Examiner—William E. Terrell
Attorney, Agent, or Firm—Burns, Doane, Swecker & Mathis

[57] ABSTRACT

A cutting insert (10) is adapted to be clamped against a tool body (14) through a first side surface (12). Grooves (21) are provided in a second side surface (11) opposed to said first side surface for providing a serrated cutting edge (16). The grooves (21) are designed such that inclination of the cutting inserts is made possible.

14 Claims, 5 Drawing Figures

CUTTING INSERT

The present invention relates to a cutting insert for chipforming machining comprising a first side surface which is adapted to rest against a supporting surface on a tool body, a cutting edge at the intersection of a second side surface and a first edge surface, said second side surface being opposed to said first side surface and providing the clearance surface, and said first edge surface extending between said first and second side surfaces, and a plurality of grooves in said second side surface so as to provide a serrated cutting edge.

In prior art cutting tools wherein cutting inserts of this type are used, such tools being disclosed in for instance U.S. Pat. No. 3,701,187 and Ser. No. 8201899-5, the cutting inserts are usually mounted in such a way that the cutting edge is parallel with the axis of rotation of the tool. This means that the whole cutting edge does hit the workpiece at the same time, which results in a bumpy working mode and causes vibrations in the tool. Due to the fact that the grooves extend across the whole side surface and have constant width an inclination of the cutting edge would mean that an incomplete clearance in the side surface be obtained. The small inclination which is possible, and which is required as to the outermost inserts when the inserts are used on end mills in form of cylindrical cutters, is insufficient for providing a satisfactory function.

The object of the invention is to provide a cutting insert having such properties that it causes the cutting tool to work as smoothly and vibrationlessly as possible. Another object of the invention is to design the grooves in such a way that the cutting insert becomes as thin and thus as inexpensive as possible. These and other objects of the invention have been attained by giving the invention the characterizing features stated in the appending claims.

The invention is described in detail in the following with reference to the accompanying drawings in which one embodiment is shown by way of example. It is to be understood that this embodiment is only illustrative of the invention and that various modifications may be made within the scope of the claims.

In the drawings, FIG. 1 shows a side view of a milling cutter provided with a cutting insert according to the invention.

Figure 1:
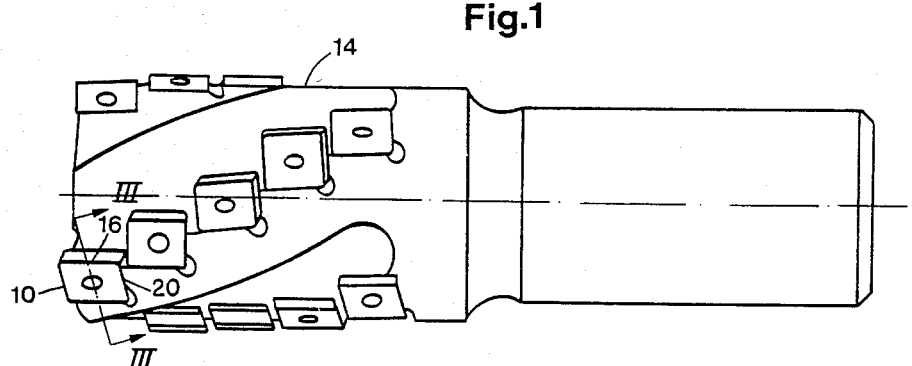

In the drawings the carbide cutting insert 10 has two parallel side surfaces 11, 12 and is intended to rest against a supporting surface 13 on a tool body 14 through an edge surface 15 which extends between the side surfaces 11, 12. A cutting edge 16 is provided at the intersection of the side surface 11 and an edge surface 17 opposed to the edge surface 15. The cutting insert 10 is in a manner known per se provided with a central hole 18 extending therethrough for receiving a fastener, not shown, by means of which the side surface 12 of the cutting insert is clamped against a supporting surface 20 in a pocket in the tool body 14. This pocket is, besides the supporting surfaces 13, 19, provided with a supporting surface 20.

Figure 2:
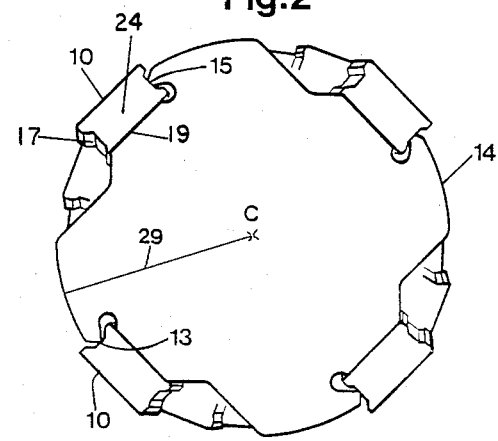
FIG. 2 is an end view of the milling cutter in FIG. 1.

In the illustrated embodiment the tool body 14 is an end mill in form of a cylindrical cutter. During machining, i.e. during the metal removal, the cutter 14 is rotated counter clockwise in FIG. 2. The side surface 11, thus, provides the clearance surface of the cutting edge 16 and the edge surface 17 provides the chip surface of the cutting edge 16. A plurality of cutting inserts 10, in the illustrated embodiment to a number of five, are arranged in a helical pattern in conventional manner in the longitudinal direction of the cutter 14. Four helical rows of inserts are equally spaced around the periphery of the cutter 14. However, it is to be understood that the cutting insert 10 can be used in other types of tools for chipforming machining, such as slotting cutters and facing cutters. The cutter 14 is designed as disclosed in Ser. No. 8201899-5 and is therefore not described in detail.

In a manner known per se a plurality of grooves 21 are provided in the side surface 11 of the cutting insert 10, said side surface being the clearance surface of the cutting edge 16, so that a serrated cutting edge is obtained. When the cutting insert 10 is mounted on the tool body 14 the cutting insert 10 is inclined in such a way that the cutting edge 16 forms an angle $\alpha$ with a plane 16 which is parallel to the rotational axis of the tool body 14. Thus, the cutting edge extends non-perpendicularly to the direction of travel 25 of the insert to present leading and trailing edges 16L, 16T, respectively. Due to this inclination the cutting edge 16 will successively along the length thereof come into cutting engagement with the workpiece, thereby resulting in a smooth and vibrationless cutting operation. According to the invention the groove 21 is designed in such a way that a rear portion 22 thereof is nearer to an edge surface 24 than a forward portion 23 of the groove, said edge surface being transverse relative to the edge surface 17 and extending between the side surfaces 11, 12 and said forward portion being located adjacent to the cutting edge 16. In other words, the groove side wall 30 located nearer to the trailing end 16T extends non-perpendicularly from the cutting edge in a direction away from the leading end 16L. Due to this design there is ensured a complete clearance in the side surface 11 during the rotation of the tool body 14. The smallest angle $\beta$ required to provide such complete clearance, said angle being measured between the centre line 27 of the groove 21 and the intersection line 28 between the groove 21 and the side surface 11, depends on the amount of the inclination of the cutting insert, i.e. the angle $\alpha$, and on the degree of overlap between the operative portions of the cutting edges of the inserts which enter into cutting engagement with the workpiece after each other, i.e. the inserts lying in the same transversal plane in FIG. 1.

Figure 3:
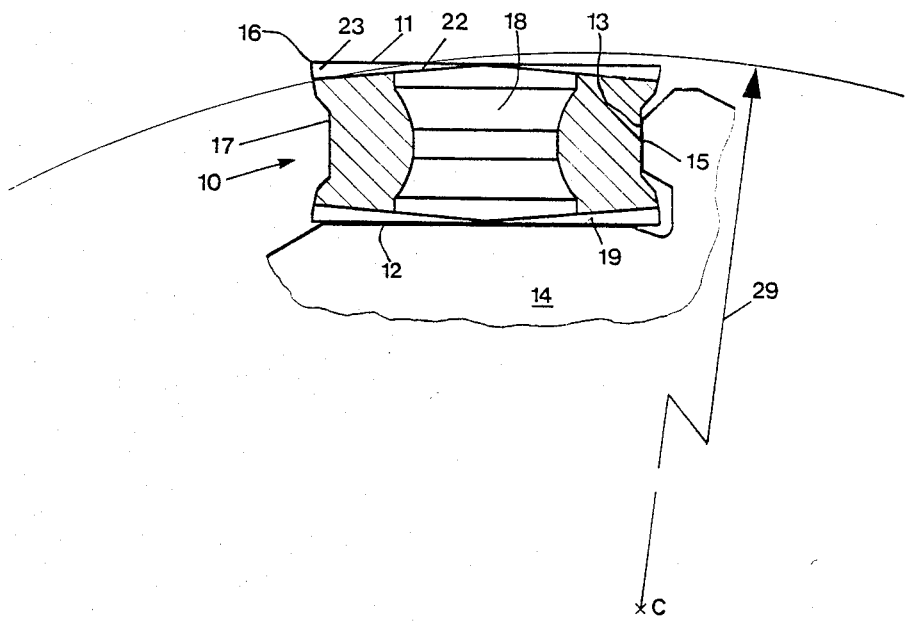
FIG. 3 is a section taken on the line III—III in FIG. 1 through the cutting insert and shows further a portion of the milling cutter.
Figure 4:
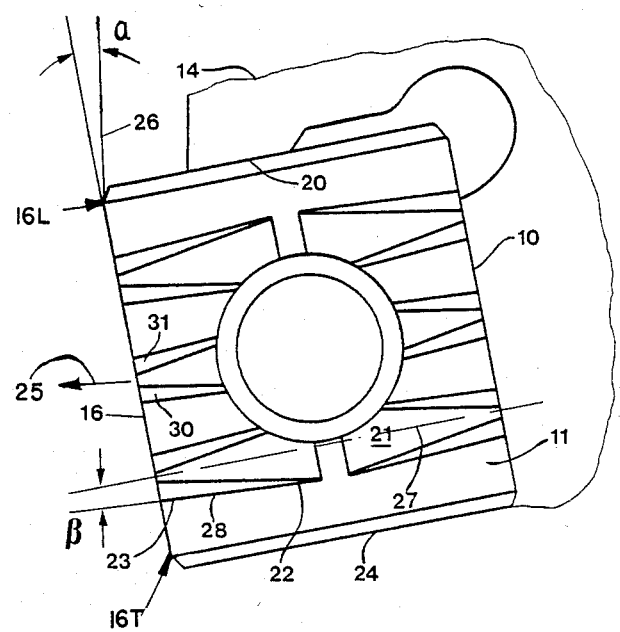
FIG. 4 is a top view of the cutting insert and the portion of the milling cutter shown in FIG. 3.

According to the invention, further, the depth of the groove 21 is larger at the portion 23 than at the portion 22, see FIG. 3. The bottom of the groove 21 is to be given such an inclination that clearance is positively provided for the radius 29 of the tool body 14. Due to the fact that the groove 21 is not made deeper than necessary the cutting insert can be made substantially thinner than if the groove would have constant depth, and thus more inexpensive. In the preferred embodiment the depth of the groove 21 decreases continuously, and the groove extends to the vicinity of the middle of the side surface 11. In order to make possible use of the cutting insert in tools intended for rotation either clockwise or counter clockwise the rear portion 22 of the groove 21 is wider than the forward portion 23 thereof. Preferably, the groove is symmetrical relative to the centre line 27.

Figure 5:
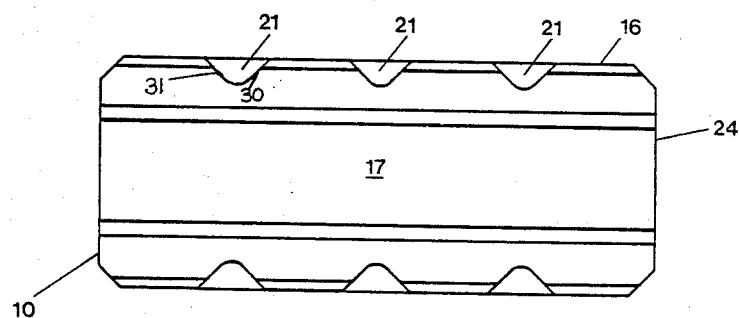
FIG. 5 shows a side view of the cutting insert in FIG. 4.

As shown in FIG. 5 the groove 21 is generally V-shaped; the side walls 30, 31 thereof including an angle in the order of 90°. The side walls 30, 31 are generally planar and triangular and the bottom of the groove is curved; the radius of curvature increasing from the forward portion 23.

Preferably, the cutting insert 10 is an indexable insert. The side surfaces 11, 12, then, are parallel and provided with equally shaped grooves, cutting edges 16, 32, 33, 34 are provided at the opposite edges of the side surfaces, and the grooves extend from both said edges.

I claim:

1. A milling cutter comprising:
   a cutter body rotatable about a longitudinal axis;
   a plurality of cutting inserts mounted on an outer periphery of said cutter body, each insert comprising:
     first and second opposing side surfaces, said first side surface being seated against said cutter body such that said second side surface is oriented generally tangentially relative to said outer periphery;
     more than two edge surfaces interconnecting said side surfaces and each being of smaller size than either of said side surfaces;
     the intersection of a forwardly facing one of said edge surfaces and said second side surface defining a cutting edge oriented obliquely relative to the rotational direction of travel of the associated insert so that, with reference to said rotational direction of travel, one end of said insert constitutes a leading end disposed forwardly of the opposite end thereof which constitutes a trailing end, whereby said cutting edge progressively cuts a workpiece from said leading end toward said trailing end; and
     a plurality of grooves formed in said second side surface, each said groove extending rearwardly from said cutting edge and including a pair of side walls, one of which side walls being located closer to said leading end and the other being located closer to said trailing end, said side wall located closer to said trailing end extending obliquely from said cutting edge in a direction away from said leading end.

2. A milling cutter according to claim 1, wherein said side of each groove located closer to said leading end extends obliquely from said cutting edge in a direction toward said leading end.

3. A milling cutter according to claim 1, wherein a forward end of each groove is deeper than a rearward end thereof.

4. A milling cutter according to claim 3, wherein each said groove progressively decreases in depth as it extends away from said cutting edge.

5. A milling cutter according to claim 1, wherein each said groove terminates adjacent a midline of said second side surface.

6. A milling cutter according to claim 5, wherein said second side surface includes an additional edge disposed opposite said cutting edge, a plurality of additional grooves extending from said additional edge toward said cutting edge in alignment with said first-named grooves and terminating at about a midline of said second side surface.

7. A milling cutter according to claim 6, wherein each said groove is wider at a rearward end thereof than at a front end thereof.

8. A milling cutter according to claim 1, wherein said side walls of each said groove are oriented symmetrically relative to an imaginary line extending perpendicularly to said cutting edge.

9. A milling cutter according to claim 1, wherein each said groove is generally V-shaped in cross-section, said side walls being planar and together forming an angle of about ninety degrees.

10. A milling cutter according to claim 1, wherein said side walls of each said groove intersect in a manner defining a curvature, said curvature having an increasing radius as said groove extends away from said cutting edge.

11. A cutting insert for use in a milling cutter, said insert comprising:
    first and second opposing, substantially parallel side surfaces,
    more than two edge surfaces interconnecting said side surfaces and each being of smaller size than each of said side surfaces,
      the intersection of at least one of said edge surfaces and one of said side surfaces defining a cutting edge having first and second ends,
    a plurality of grooves formed in said one side surface and extending from said cutting edge, each said groove including a pair of side walls which converge toward a bottom of said groove, a first of said side walls being located closer to said first end of said cutting edge and a second of said side walls being located closer to said second end of said cutting edge, said second side wall being planar and extending obliquely from said cutting edge in a direction away from said first end.

12. A cutting insert according to claim 11, wherein said side walls of each said groove intersect in a manner defining a curvature, said curvature having an increasing radius as said groove extends away from said cutting edge.

13. A cutting insert according to claim 11, wherein a forward end of each said groove is deeper than a rearward end thereof.

14. A cutting insert according to claim 11, wherein said one side surface includes an additional edge disposed opposite said cutting edge, a plurality of additional grooves extending from said additional edge in alignment with said first-named grooves, said first-named grooves and said additional grooves terminating at about a midline of said insert.

* * * * *